July 24, 1923.
H. A. DE VRY
1,462,487
MECHANISM FOR REWINDING FILMS
Filed Sept. 24, 1919
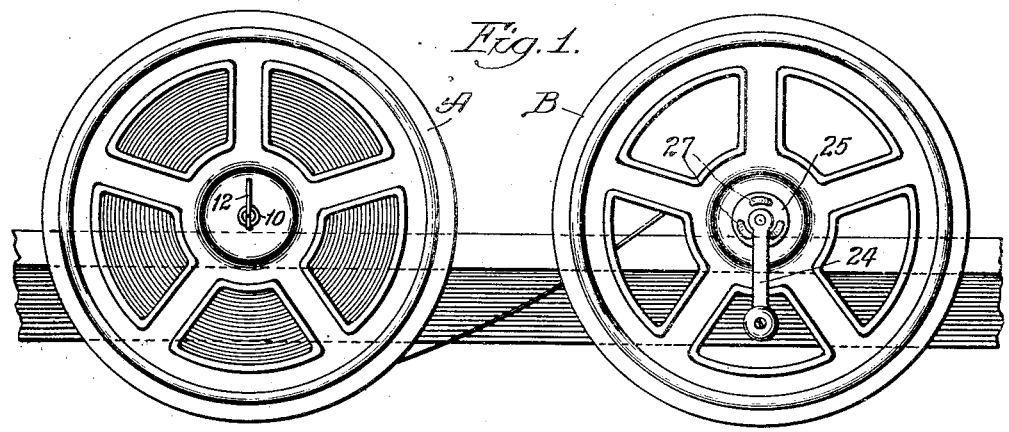
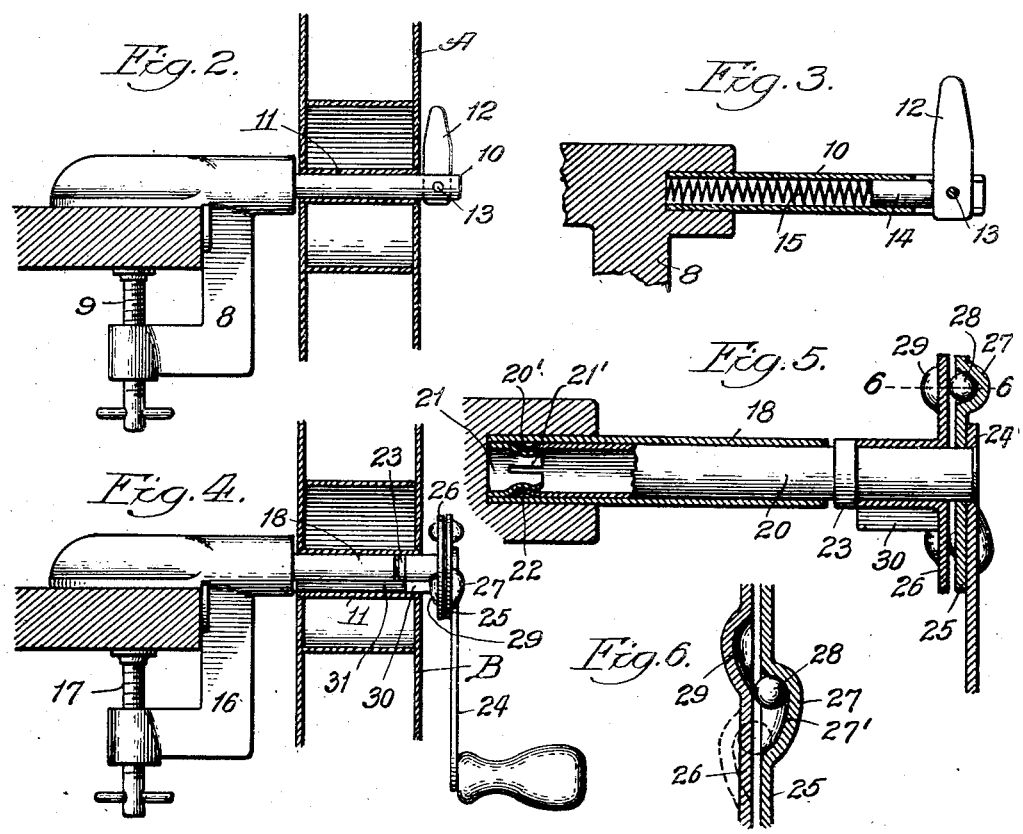

Patented July 24, 1923.

1,462,487

UNITED STATES PATENT OFFICE.

HERMAN A. DE VRY, OF CHICAGO, ILLINOIS, ASSIGNOR TO THE DE VRY CORPORATION, OF CHICAGO, ILLINOIS, A CORPORATION OF ILLINOIS.

MECHANISM FOR REWINDING FILMS.

Application filed September 24, 1919. Serial No. 325,974.

*To all whom it may concern:*

Be it known that I, HERMAN DE VRY, a citizen of the United States, and a resident of Chicago, in the county of Cook and State of Illinois, have invented certain new and useful Improvements in Mechanism for Rewinding Films, of which the following is a full, clear, and exact description.

The invention relates to mechanism for rewinding films. In the use of motion picture projectors, it is necessary that the film be wound on the spool so that the end having the initial portion of the picture thereon will be on the outside of the coil, and for this purpose, it is necessary to run the film onto a feed spool from a take-up spool before the film can be exhibited again.

The object of the present invention is to provide a simple and improved mechanism by which this rewinding may be effected.

In devices used heretofore, it has been customary to use multiplying gears between a crank and the spool. The present invention consists primarily in simplifying this mechanism by avoiding the use of the multiplying gears and making provision for the speedy rotation of the spool by impulse and momentum.

The invention consists in the several novel features hereinafter set forth and more particularly defined by claims at the conclusion hereof.

In the drawings: Fig. 1 is a side elevation of mechanism embodying the invention. Fig. 2 is a view of the device for holding the take-up spool from which the film is to be removed. Fig. 3 is a detail section through the spindle of said device. Fig. 4 is a side elevation of the device for rewinding the film on the feed-spool, the latter being shown in section. Fig. 5 is an axial section of said device. Fig. 6 is a detail section taken on line 6—6 of Fig. 5.

The device for holding a spool A upon which the film has been wound after exposure or that known as a "take-up" spool in the projector comprises a bracket 8 which is adapted to be secured to a table by a clamp-screw 9, a hollow spindle 10 secured in the bracket, projecting from one end thereof and adapted to pass through the bearing-sleeve 11 of the spool A, and a keeper 12 for removably holding the spool on the spindle. The keeper 12 is pivoted, as at 13, in one end of the spindle 10 and a bolt 14 acted upon by a spring 15 in the spindle 10, serves to hold the keeper either in operative position, as shown in Figs. 2 and 3, or in operative position when the keeper is turned into alignment with the spindle.

The device for holding the spool B upon which the film is to be rewound usually designated the "feed-spool" comprises a bracket 16 having a screw 17 which is adapted to clamp said bracket 16 to a table and a sleeve 18 fixedly secured to and projecting from one end of the bracket 16. The sleeve 11 of the spool B is adapted to fit around the sleeve 18.

The device for rotating the spool B to rewind the film thereon comprises a hollow spindle 20 which is adapted to be slipped endwise into the sleeve 18 and to be removably held therein by the resilient end 21' of a tube 21 which is fixed in the inner end of sleeve 18. The inner end 20' of spindle 20 is contracted and adapted to snap into interfitting relation with the groove 22 in the tube 21. A collar 23 rigid with the spindle 20 is disposed adjacent the end of the sleeve 18 and a crank 24 is rigidly secured or riveted to the outer end of the spindle 20. An outer clutch-disk 25 is rigidly secured to crank 24 and spindle 20 so that it will rotate therewith. A coacting clutch-disk 26 is revolubly mounted on the spindle 20 between collar 23 and the clutch-disk 25. The latter is provided with pockets 27 each containing a ball 28 and the clutch-disk 26 is provided with recesses 29. A rib 30 formed on the clutch-disk 26 is adapted to enter a corresponding groove 31 in the spool B so that the spool and said disk will rotate together. The pockets or recesses 27 in the clutch-member 25 are shaped so that when the crank is rotated in proper direction to wind the film on the spool B, the inclined portion 27' of each pocket 27 will force the ball 28 into one of the pockets 29 of clutch-member 26 and thus the balls will lock the members together. A characteristic of this construction is that the operator, by giving an impulse or rapid stroke to the crank 24, will cause the spool B to rotate rapidly as the result of the impulse and momentum, balls 28 permitting the member 26 to race or rotate independently the crank clutch-member 25.

This construction exemplifies a simple clutch between the crank and the spool upon which the film is to be wound and by which the spool may be rapidly operated without continuously rotating the crank or attempting to operate the crank at the speed of the spool.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a film rewinding mechanism, the combination of a support for the spool on which a film is to be wound, a spindle removably held in said support, a crank fixed to the spindle, a one-way clutch comprising a member rigid with the crank and spindle, and a member on the spindle and rotatable with the spool, the clutch permitting the spool to rotate and wind up the film by momentum when the crank is held.

2. In film rewinding mechanism, the combination of a support for the spool on which a film is to be wound, a spindle removably held in said support, a readily detachable connection between the spindle and the support, a crank fixed to the spindle, and a one-way clutch comprising a member rigid with the crank, and a member rotatable on the spindle and with the spool, the clutch permitting the spool to rotate and wind up the film by momentum when the crank is held.

3. In film rewinding mechanism, the combination of a support comprising a sleeve for the spool upon which the film is to be wound, a spindle fitting in the sleeve, a readily detachable connection between the spindle and the sleeve, a crank fixed to the spindle, and a one-way clutch comprising a member rigid with the spindle and crank, and a member rotatable on the spindle and with the spool, the clutch permitting the spool to rotate by momentum when the crank is held.

4. In film rewinding mechanism, the combination of a bracket, a sleeve fixed on said bracket, a spindle removably held in said bracket, a crank fixed to the spindle, a hub loose on the spindle adapted to rotate the spool, and a one-way clutch comprising disks fixed to the crank and hub respectively and anti-friction balls between said disks.

HERMAN A. DE VRY.